United States Patent

Nema

[11] 4,161,482
[45] Jul. 17, 1979

[54] PRODUCTION OF POLYOLS CONTAINING BASIC NITROGEN

[75] Inventor: Suresh K. Nema, Kerala, India

[73] Assignee: The Indian Space Research Organisation, Bangalore, India

[21] Appl. No.: 773,543

[22] Filed: Mar. 2, 1977

[51] Int. Cl.$^2$ ............................ C09F 5/00; C11C 3/00
[52] U.S. Cl. ...................................... 260/404; 260/407
[58] Field of Search ............ 260/404, 404.5 EO, 405, 260/407

[56] References Cited

U.S. PATENT DOCUMENTS

| | | | |
|---|---|---|---|
| 1,799,824 | 4/1931 | Kerm | 260/404 |
| 2,089,569 | 8/1937 | Orthner | 260/404 |
| 2,228,986 | 1/1941 | De Groote | 260/404 |
| 2,372,797 | 4/1945 | Seyessemann et al. | 260/404 |
| 2,491,478 | 12/1949 | Cook et al. | 260/404 |
| 3,006,935 | 10/1961 | Albrecht | 260/404.5 |
| 3,133,941 | 5/1964 | Edwards et al. | 260/404.5 |

*Primary Examiner*—John Niebling
*Attorney, Agent, or Firm*—Haseltine, Lake & Waters

[57] ABSTRACT

Polyols containing basic nitrogen of the formula

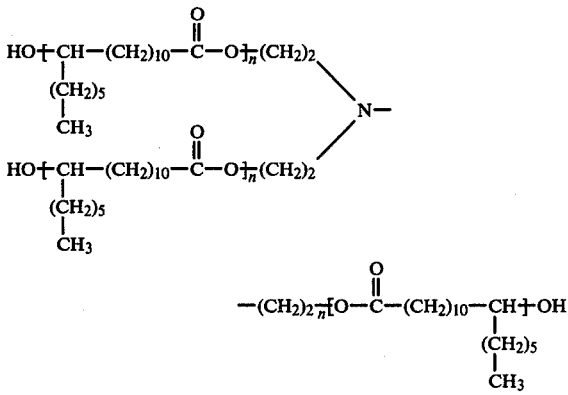

wherein n denotes the degree of polymerization of the homopolymer of 12-hydroxy stearic acid, and varies between 2 and 10. The compounds are useful as precursors of urethane polymers.

1 Claim, No Drawings

PRODUCTION OF POLYOLS CONTAINING BASIC NITROGEN

The present invention is concerned with novel polyols containing basic nitrogen and a process for producing such polyols.

Polyols or hydroxyl terminated polymers are the precursors of urethane polymers. Most of the commercial polyols are of polyether or polyester type. However, the polyether types have so far found wider applications and larger demand as compared to polyester type polyols in the urethane industry. Naturally occurring ester type polyols, like castor oil, have also been found suitable for various commercial applications. Castor oil and its derivatives have been used as polyols in three different ways: (a) unmodified castor oil as basic polyol (b) its transesterified product, and (c) esters of its fatty acids. The ester type polyols mentioned above could not lead on to wide and bulk applications in the urethane industry, as any modification in chemical structures of the ester type polyols was aimed to meet only a specific end use.

There have previously been attempts to get polymers from fatty acids of castor oil for various applications. For example, according to U.S. Pat. No. 2,785,978 mixture of fatty acids of castor oil have been intramolecularly polymerized at 200° to 230° C. in vacuum for 16 hours under nitrogen atmosphere and further the resulting estolides have been esterified with high molecular weight polyglycerol. These products have been reported to be useful in the preparation of water-in-oil emulsions and chocolate coating for ice-cream briquettes. Almost similar products have been produced in semi-liquid or pasty form as described in Dutch Pat. No. 82,891 and they are used as stabilizers and emulsifying agents.

Ehrlich, A., M. K. Smith and T. C. Patton (J. Am. Oil Chem. Sec. 36, 149 (1959)) have reported various ricinoleic acid and 12-hydroxy stearic acid polyols for urethane foams and elastomer applications. These polyols are low molecular weight monoesters of ricinoleic acid and 12-hydroxy stearic acid with various glycols, glycerol or pentaerythritol. Though the polyols thus prepared would have higher functionality and increased molecular weight to a limited degree, the concept of polymerizing the fatty acids of castor oil and suitably modifying the same has not been cited. Low molecular weight monoesters of ricinoleic acid have also been reported by Baker Castor Oil Co., U.S.A under the trade/name of Polycin. [See Patton T. C., A. Ehrilich, and M. K. Smith, Rubber Age (New York) 86, 639 (1960)].

U.S. Pat. No. 3,004,917 describes the composition of engine lubricating oils, containing rust inhibitor in which polyethylene glycol-bis-(triricinoleate) with a total molecular weight of 2,000 has been used.

According to German Pat. No. 1,940,294 (Cl.C08f), a polyester of molecular weight of 1700 was prepared by autocondensation of 12-hydroxy stearic acid condensed with glycidyl methyl acrylate, to introduce unsaturation, and copolymerized with methyl methacrylate. These polymers have been found to increase the stability of non-aqueous polymer dispersions.

German Pat. No. 2,032,297 describes a hydroxyl terminated polyester produced by reacting diol or triol with poly($\omega$-hydroxy caproic acid) or poly(12-hydroxy stearic acid) and these polyesters are used as urethane adhesives for polyvinyl chloride. The preparation of the polyesters with terminal polyhydroxy groups starting from 12-hydroxy stearic acid and their use as film forming coatings are described in U.S. Pat. No. 3,741,941.

However, none of the above patents covers the concept that is covered in the present invention that provides a range of polyols for a variety of applications. The present invention adopts a method involving the use of fatty acids of castor oil for the production of polyols. The present invention can produce polyols, having basic nitrogen in their backbone, of desired average molecular weights, functionality and of any desired nature of functionality so as to substitute for polyether based polyols, which are petrochemical based. The presence of basic nitrogen in the backbone of polyols helps in getting rid of volatile amine catalyst in the formulations using these polyols.

Polyols containing basic nitrogen, may be obtained by homopolymerizing THSA in an aromatic solvent in the presence of a catatytically effective amount of p-toluene sulfonic acid monitoring the degree of polymerization by measuring the drop in the acid value of the said homopolymer till the degree of polymerization ranging from 2 to 10 is achieved, esterifying the said poly-THSA with methyl alcohol, followed by transesterification of the resulting methyl ester of the said poly-THSA with triethanolamine.

A process as described above wherein the catalyst is removed from poly-THSA after esterifying the said poly-THSA with methyl alcohol by percolating the cooled reaction mixture through an ion-exchange resin.

From hereinafter 12-hydroxy stearic acid is referred as THSA.

The chemical reactions taking place in the two steps are given below, wherein n denotes the degree of polymerization of the homopolymer of 12-hydroxy stearic acid which varies between 2 and 10:

Step-1—Homopolymerization

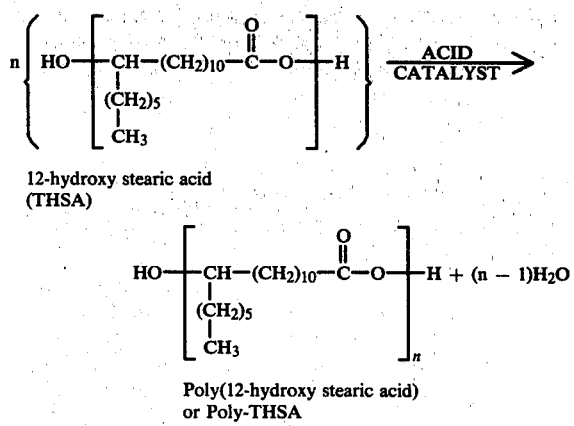

12-hydroxy stearic acid (THSA)

Poly(12-hydroxy stearic acid) or Poly-THSA

Step-2—Methyl ester formation

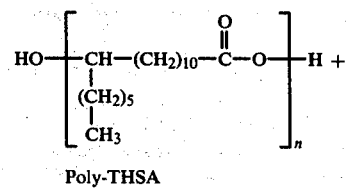

Poly-THSA

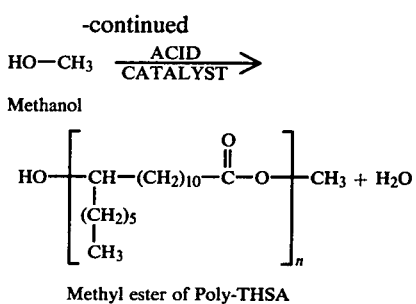

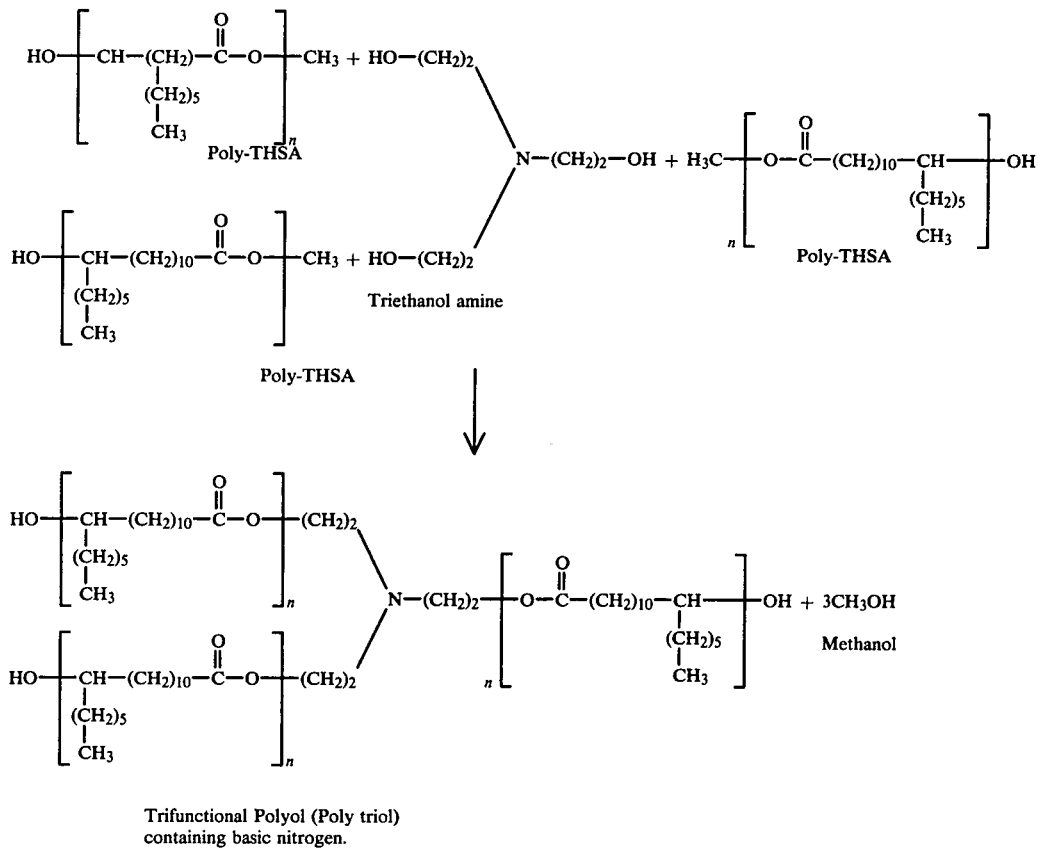

Step-3—Modification by transesterification

Trifunctional Polyol (Poly triol) containing basic nitrogen.

In the present invention, water formed during condensation-polymerization of 12-hydroxy stearic acid is removed continuously by azeotropic distillation using a solvent (either aliphatic, cyclic or aromatic hydrocarbon) as entraining agent. Bawn et. al. (Bawn. C. E. F., and Buglin M. B. (Uni. Liverpool, England). Polymer 3, 257-62(1962)) found that degree of polymerization (DP) in melt polymerization of THSA at a given temperature is porportional to the concentration of catalyst p-toluene sulfonic acid (PTSA). At a given temperature and concentration of the catalyst, the degree of polymerization (DP) is found to increase linearly with time. The departure from this phenomenon is found to occur only at higher temperature (above 150° C.). In the present invention, polymerization reaction temperature has been kept under control with the use of suitable solvent as entrainer.

As a first step, THSA is dissolved in toluene or xylene (to get 20 to 80% solution). THSA is homopolymerization in solution in the presence of the catalyst PTSA (0.1 to 2% of THSA) to the desired level (DP 2 to 10). The degree of polymerization is monitered by noting down the drop in acid value of the homopolymer (Poly-THSA). At this stage, as a second step, the required quantity of methyl alcohol is added to the product of Step-1 so as to react completely with the carboxyl content of poly-THSA to form methyl ester of poly-THSA. The reaction products of Step-2 are percolated through a column of suitable ion-exchange resin where the catalyst, PTSA, is held back after exchange in the column. The final product polyol having basic nitrogen is obtained in Step-3 by the transesterification of methyl ester of poly-THSA and alkanolamine such as diethanolamine, triethanolamine or any other such similar compound, where methanol is removed.

The nature of the hydroxyl groups (such as primary or secondary) in the final product polyol, the molecular weight of the final product polyol and the number of hydroxyl groups required per molecule of polyol can be controlled in Step-3, as desired, by following the procedure given in the present invention.

The following example illustrates the typical method of preparation of different molecular weight polyols modified by triethanolamine (for poly-triol of 3400 to 3800 molecular weight).

EXAMPLE-1

Preparation of poly-triol 3400 to 3800 molecular weight containing basic nitrogen.

The experiment was carried out in four stages a, b, c and d as described below:

(a) 300 g of THSA (minimum 98% purity), 225 ml of distilled commercial toluene and 3 g of anhydrous p-toluene sulphonic acid were charged into a three necked round bottomed (one liter) flask with an arrangement for heating to 120° to 150° C. and continuous removal of water azeotropically (Dean and Stark trap). The reaction mixture was kept under agitation by a mercury seal stirrer, fitted to the flask. The water formed by condensation was continuously removed from the system till 13.29 g of water was collected in the Dean and Stark trap (or till the acid value of the reaction products dropped to 29.98 mg KOH/g).

(b) The reaction mixture was cooled to room temperature and 8.5 g of 99% pure methanol was added. It was refluxed for 5 hours till the acid value dropped to 2.8 mg KOH/g. The mixture was then cooled to room temperature.

(c) The reaction mixture was percolated through a 100 ml column of ion-exchange resin (Zeocarb-225) with a free volume of one liter. The percolation rate was maintained at 20 ml per hour.

(d) The elute obtained after the percolation from (c) was put in a 1 liter round bottom flask and was distilled under reduced pressure to recover the toluene and 12.21 g of triethanolamine was introduced immediately after the toluene recovery. The mixture was refluxed for 6 hours at 140° C. Subsequently, on distillation under vacuum for 4 hours, 7.95 g of methanol was collected. The reaction mixture was cooled and 240 g of polytriol, containing basic nitrogen, was obtained having the following properties:

1. Hydroxyl value (mg KOH/g)—53
2. Acid value (mg KOH/g)—1.05
3. Iodine value—2.80
4. Viscosity at 30° C. in cps—3100
5. Specific gravity at 27° C.—0.940
6. Average molecular weight—3350

What is claimed is:

1. Polyols containing basic nitrogen of the formula

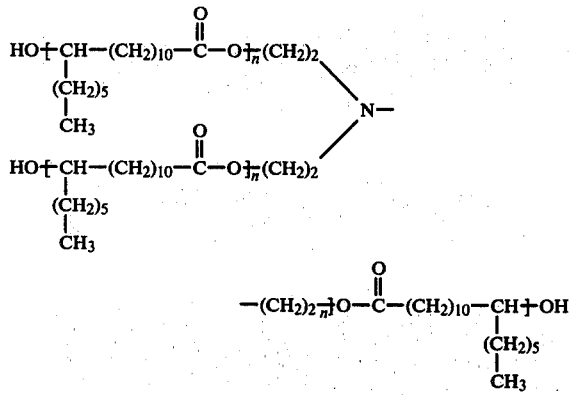

wherein n denotes the degree of polymerization of a homopolymer of 12-hydroxy stearic acid which varies between 2 and 10.

* * * * *